Dec. 18, 1923.

P. MARINONI

PIPING FOR PRESSURE FLUIDS

Filed May 5, 1921

1,478,129

Inventor
P. Marinoni
By Marks & Clerk
Attys.

Patented Dec. 18, 1923.

1,478,129

UNITED STATES PATENT OFFICE.

PIETRO MARINONI, OF MILAN, ITALY.

PIPING FOR PRESSURE FLUIDS.

Application filed May 5, 1921. Serial No. 467,190.

*To all whom it may concern:*

Be it known that PIETRO MARINONI, a subject of the King of Italy, and residing at Milan, Italy, has invented certain new and useful Improvements in Pipings for Pressure Fluids, of which the following is a specification.

The present invention has reference particularly to fluid conduits and more particularly relates to improved pipe systems for conducting fluids under pressure.

Heretofore in power plants in conducting water from the source of supply to the plant it has been customary to use heavy steel or other metallic pipings resulting in a considerable expenditure from a constructional standpoint. It is the primary aim and object of the present invention to reduce the cost in constructing pipings by employing in lieu of a heavy steel pipe a pipe constructed of thin metal or the like combined with a suitable reinforced cementitious conduit.

More particularly the present invention resides in the provision of a pipe system wherein a hole is first dug horizontally beneath the surface of the ground and partly filled with a cementitious or gravel like substance the latter contacting with the walls of the hole and in addition leaving a central conduit for the reception of the improved sheet metal pipe.

It is a more specific object to provide improved means for reinforcing the cementitious wall or external lining; to improve the construction of the sheet metal piping by the provision of means permitting the same to expand upon the cracking of the cementitious external lining and to also provide improved metal strips and bands for covering the longitudinal and annular grooves in the piping which permits the expansion of the pipe. Among the other aims and objects of the invention may be recited the provision of an arrangement of the above character with a view to compactness and wherein the number of parts are few, the construction simple, the cost of production low and efficiency high.

Further objects, as well as the nature, characteristic features and scope of the invention will be more readily apparent taken in connection with the drawings and pointed out in the claims forming a part of this specification.

The invention is clearly illustrated in the accompanying drawings, in which:—

Similar characters of reference are employed in all of the above described views to indicate corresponding parts.

Referring now, more particularly, to the accompanying drawings there is dug beneath the surface of the ground a horizontal hole or passageway in the present instance of a substantially rectangular shape, the same being filled with cementitious or gravel-like substance $a$ which contacts with walls of the passageway and in which is formed a central conduit $b$ which is circular in cross-section. This conduit receives the light sheet metal pipe $c$ desirably constructed and in telescopically engaged sections and provided throughout with intersecting annular and longitudinal external grooves $d$ preferably formed as by bending or crimping at the desired points.

Figure 2:
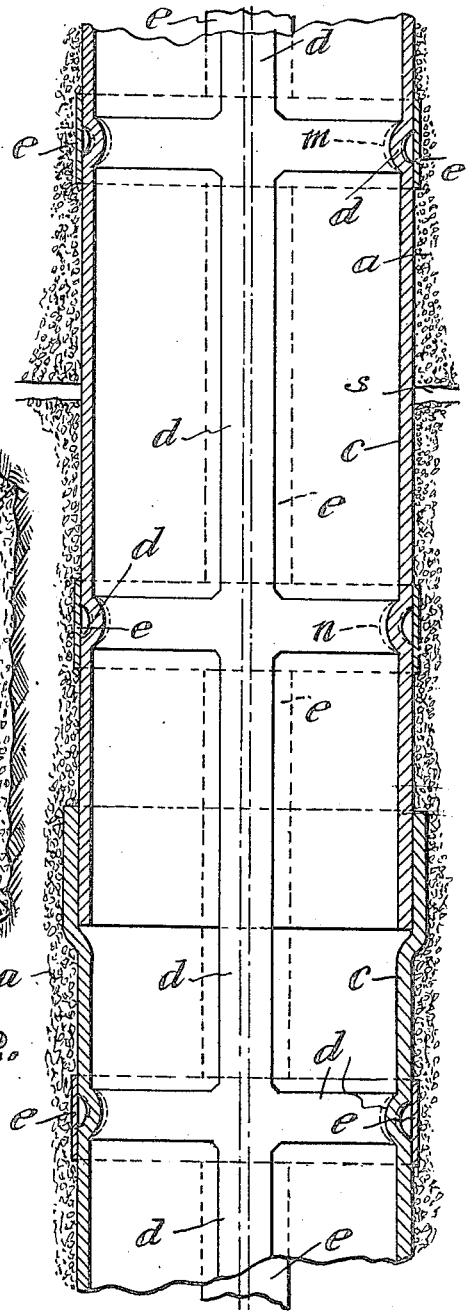
Fig. 2 is an enlarged fragmentary longitudinal sectional detail thereof.

When the pipe is inserted the grooves $d$ are covered with strips and bands $e$ lying respectively over the longitudinal and annular grooves as indicated in Fig. 2, said strips being extended throughout the length of the grooves for preventing cementitious or gravel-like substance $a$ from entering these grooves so that in the event of a crack occurring in the substance $a$ between the points $m$, $n$ in Fig. 2 the pipe $c$ will expand or slide by reason of the increased diameter of the conduit $b$ when the crack occurs. This partial or whole flattening of the grooves $d$ is effected by the pressure of the fluid being conducted in the pipe.

Figure 1:
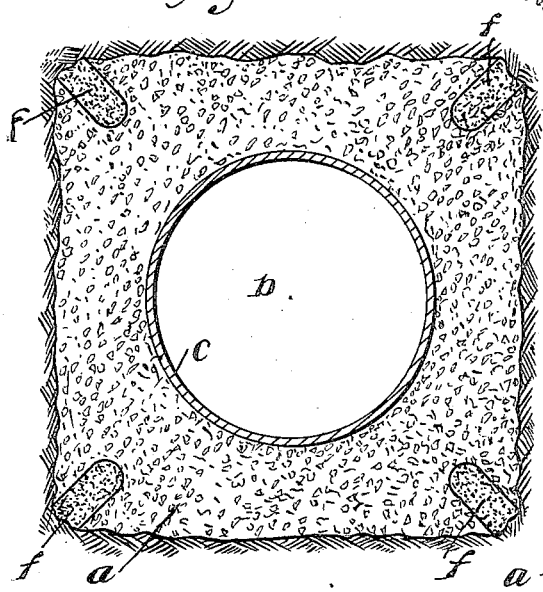
Fig. 1 is a transverse sectional view showing the improved piping system.

To further reinforce the piping system at the time of the laying of the cementitious or gravel-like body $a$ suitable canals are provided in the present instance at the corners of the passage-way as indicated in Fig. 1 and these are filled with liquid cement under pressure for the purpose of reinforcing the cementitious body and reducing the possibility of cracking of the same.

It is believed in view of the foregoing that the advantages of the invention will be readily apparent and that a further detailed description of the invention is entirely unnecessary.

Likewise it is believed that the advantages of the piping system will be apparent.

Having thus fully described the invention what is claimed and desired to be secured by Letters Patent is:—

A piping arrangement of the character described including in combination, an outer piece of piping of cementitious material, an inner piece of piping constructed of light sheet metal and provided with external longitudinal and annular grooves intersecting each other, and external metallic protecting strips for covering the grooves.

ING. PIETRO MARINONI.